United States Patent [19]

Carlson

[11] Patent Number: 5,104,156
[45] Date of Patent: Apr. 14, 1992

[54] MALE END FITTING

[75] Inventor: John A. Carlson, Wayne, Pa.

[73] Assignee: Teleflex Incorporated, Limerick, Pa.

[21] Appl. No.: 599,654

[22] Filed: Oct. 18, 1990

[51] Int. Cl.⁵ .............................................. F16L 37/12
[52] U.S. Cl. ................................... 285/305; 285/91; 285/317
[58] Field of Search .................. 285/305, 317, 321, 91

[56] References Cited

U.S. PATENT DOCUMENTS

| | | | |
|---|---|---|---|
| 3,208,300 | 9/1965 | Morse | 74/498 |
| 3,922,011 | 11/1975 | Walters | 285/321 X |
| 4,645,245 | 2/1987 | Cunningham | 265/321 |
| 4,867,487 | 9/1989 | Phillis | 285/303 |

FOREIGN PATENT DOCUMENTS

| | | | |
|---|---|---|---|
| 233336 | 5/1964 | Austria | 285/305 |
| 1145667 | 3/1969 | United Kingdom | 285/305 |

Primary Examiner—Dave W. Arola
Attorney, Agent, or Firm—Reising, Ethington, Barnard, Perry & Milton

[57] ABSTRACT

A motion-transmitting remote control assembly (10) comprises a flexible conduit (14) with a flexible core element (12) passing therethrough. The flexible conduit (14) has a male coupler (22) attached to one end of the flexible conduit (14). The male coupler (22) comprises a leading chamfered surface (24) and a relief (26) for being locked into a first type of female housing (28) via a spring biased locking ring (32). The male coupler (22) also includes a truncated convex surface (29) which, along with the relief (26), allows the male coupler (22) to be locked into a second type of female housing (110) having removable bolt (116) passing therethrough. The long cylindrical body portion (118) of the bolt (116) positively abuts the relief (26) to lock the male coupler (22) in the female housing (110).

4 Claims, 2 Drawing Sheets

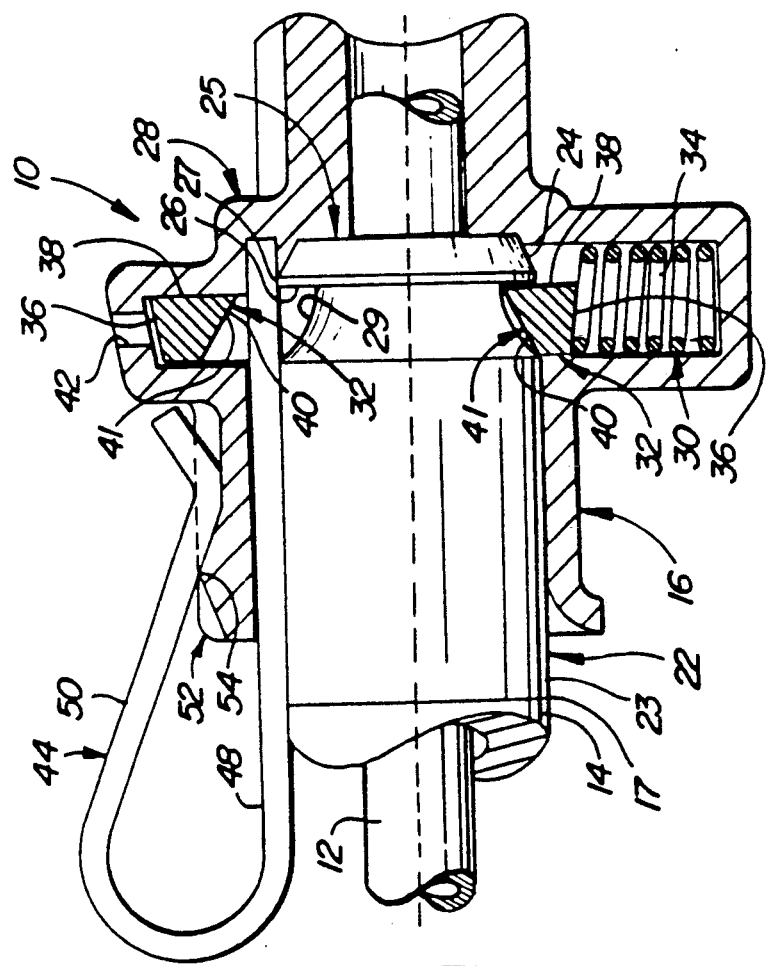
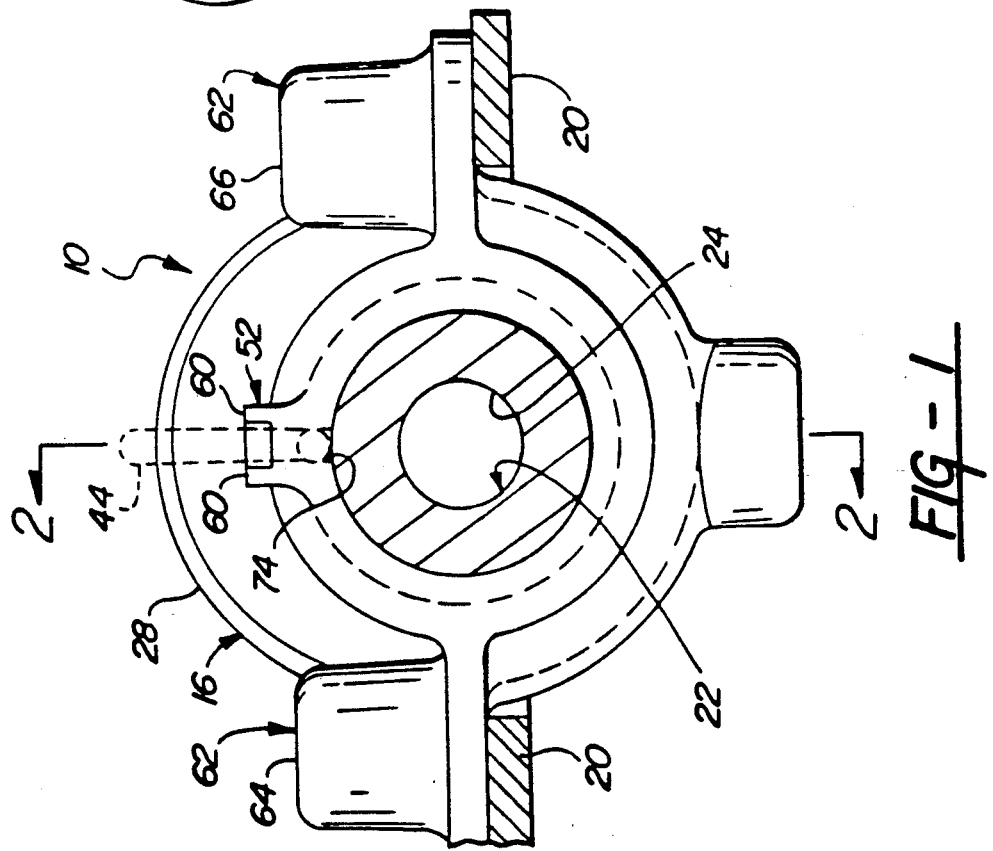
FIG-2
FIG-1

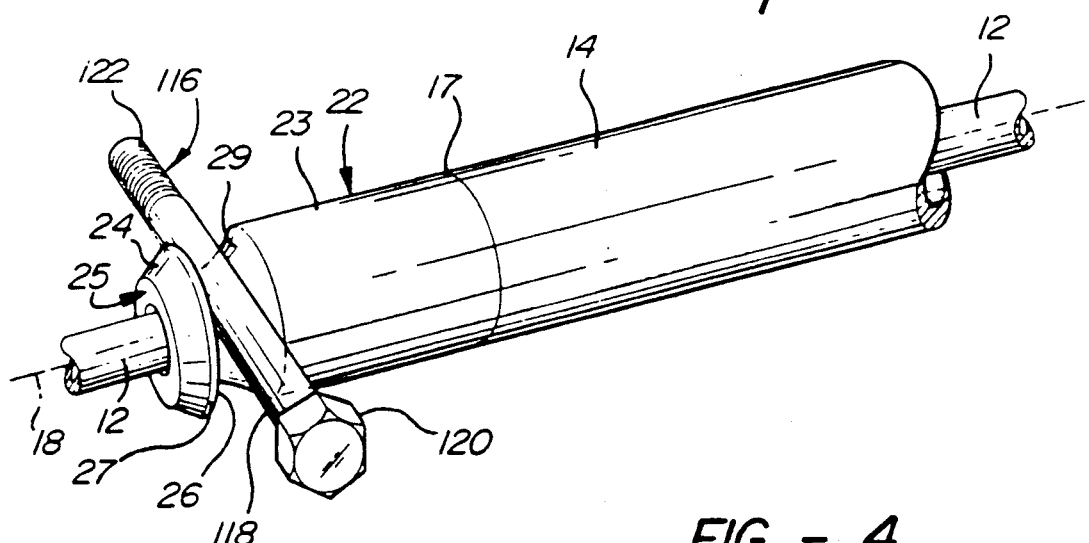
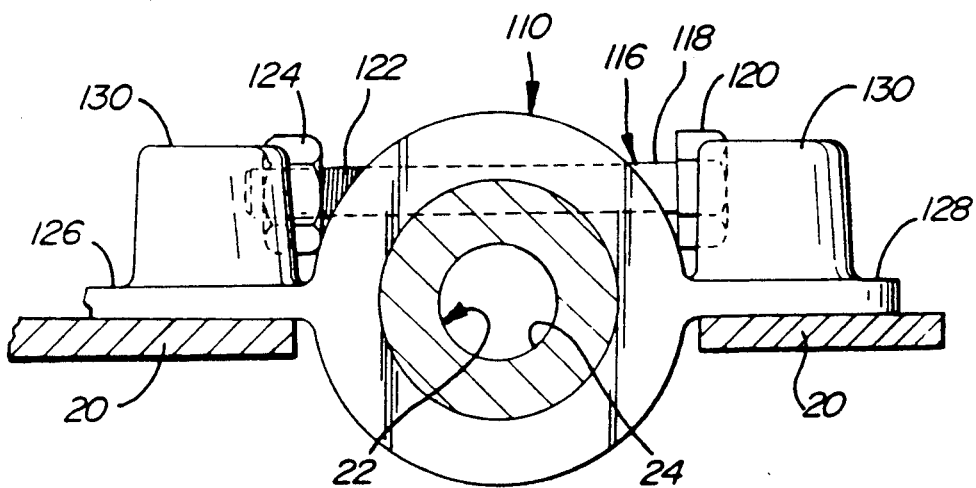
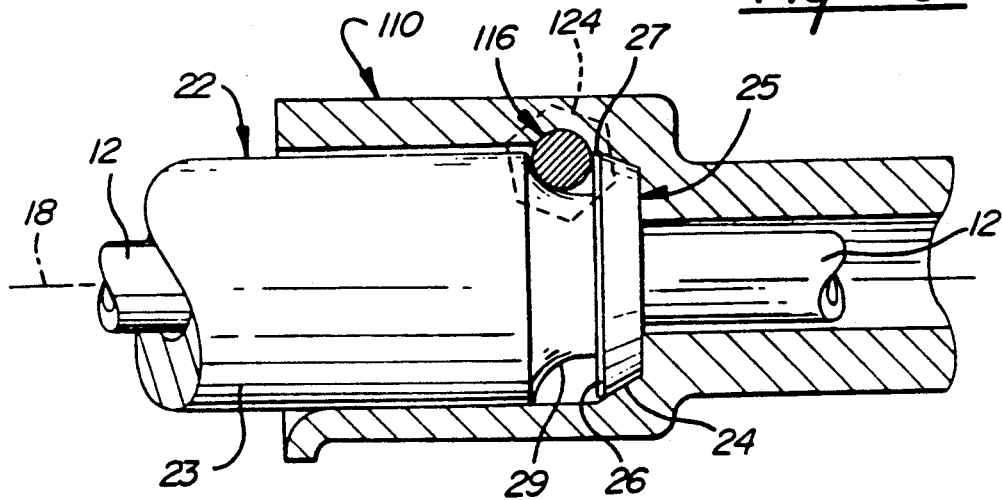

MALE END FITTING

BACKGROUND OF THE INVENTION

1. Field of the Invention

The subject invention relates to a remote control assembly having a flexible conduit and a motion-transmitting core element. More particularly, the subject invention relates to the male end of a coupling for the flexible conduit.

2. Description of Related Art

Male couplers of the type with which the instant invention is particularly applicable typically include one surface which positively contacts a surface of the female coupler to hold the flexible conduit in place. Both the male coupler and the female coupler are designed to allow that which passes through the conduit—typically a motion-transmitting core element—to pass therethrough. The motion-transmitting core element may be of any type suitable for movement within such a conduit. For example, such motion-transmitting core elements are frequently utilized as push/pull mechanisms in vehicles and marine craft for steering mechanisms, throttle controls or the like. Frequently, one or both ends of the conduit pass through an aperture in a bulkhead or need to be secured to a support structure and a fitting is disposed in the aperture to support the conduit in the bulkhead. In many of the prior art assemblies, fittings which attach the core element to a control member or which support the conduit frequently engage an aperture by being snapped into mechanical engagement with the aperture. An example of such a fitting is shown in a copending application of the same inventorship and assigned to the same assignee as the subject invention.

A facility that the prior art assemblies is the versatility in locking a male coupler into a plurality of locking systems wherein the locking or abutting surfaces are different.

U.S. Pat. No. 3,208,300 to J. F. Morse, issued Sep. 20, 1962 discloses a remote control assembly for a steering helm of a marine craft. The flexible conduit of the motion-transmitting element is fixedly secured to the steering helm assembly by inserting a bolt through a hole in the steering assembly when a cut-away portion of the flexible conduit is aligned with the hole in the steering helm assembly. This locking mechanism is deficient because the male coupler of the flexible conduit can only be used with a bolt-type locking mechanism.

SUMMARY OF THE INVENTION AND ADVANTAGES

A male coupler end fitting assembly is used for coupling a flexible conduit to a female housing. The female housing may have either a spring biased ring lock or a removable bolt lock. The flexible conduit also has a flexible core element extending therethrough. The assembly comprises a flexible conduit having a longitudinal axis extending between the opposite ends thereof. The male coupler is fixedly attached to the flexible conduit for removably securing the flexible conduit to a support structure. The male coupler comprises a substantially cylindrical body portion defining an outer circumference and a leading end and a conduit attachment end disposed on either side of the cylindrical body portion. The leading end of the male coupler has a leading chamfered surface and relief circumscribing the male coupler. The relief is disposed adjacent the leading chamfered surface and is perpendicular to the longitudinal axis. The relief extends from the outer circumference to an inner circumference which is smaller than the inner circumference. The assembly is characterized by truncated surface means for increasing the circumference of the cylindrical body portion from the inner circumference at the relief to the outer circumference, by sloping upwardly at a constantly changing slope. The advantage of the male coupler is its ability to receive a bolt to lock the male coupler in a female housing in addition to the ability to receive a spring biased ring which can also lock the male coupler in a female housing.

FIGURES IN THE DRAWINGS

Other advantages of the present invention will be readily appreciated as the same becomes better understood with reference to the following description when considered in connection with the accompanying drawings wherein:

FIG. 1 is an end view of the subject invention inserted into a spring biased ring lock female housing with a retaining clip shown in phantom;

FIG. 2 is a cross-sectional view of the subject invention taken along line 2—2 of FIG. 1;

FIG. 3 is a perspective view of the subject invention with a bolt placed in a locking position;

FIG. 4 is an end view of the subject invention inserted into a female housing having a bolt-type locking mechanism; and FIG. 5 is a cross-sectional view of the subject invention taken along line 5—5 of FIG. 4.

DETAILED DESCRIPTION OF THE PREFERRED EMBODIMENT

The subject invention, a male coupler end fitting, is generally indicated at 22 in the Figures. FIGS. 1 and 2 show the subject invention 22 coupled with one type of female housing, generally indicated at 28, and FIGS. 3, 4 and 5 show the subject 22 coupled in a second type of female housing, generally indicated at 110. The subject invention 22 is to be used in a motion-transmitting remote control assembly, generally shown at 10. The numbers used when describing the male coupler 22 will remain the same for each embodiment whereas the first 28 and second 110 types of female housings will be numbered in two different ranges; they being 1-99 and 110-199, respectively.

As may be seen from all the Figures, the male coupler 22 is coupled with two types of female housings 28, 110. The first female housing 28, shown in FIGS. 1 and 2, comprises a spring biased 30 ring lock 32. The second female housing 110 comprises a removably bolt lock 112, both of which will be discussed in greater detail subsequently. The flexible conduit 14 has a flexible core element 12 extending therethrough. The flexible conduit 14 defines a longitudinal axis 18 extending between its opposite ends (one shown).

The male coupler 22 is fixedly attached to the flexible conduit 14 at one of the opposite ends. The means for attachment of the male coupler 22 to the flexible conduit 14 may be any one of a variety of attaching means well-known in the art, i.e., insertion molding or snapping pieces. The male coupler 22 removably secures the flexible conduit 14 to a support structure 20 such as a steering helm.

The male coupler 22 includes a substantially cylindrical body portion 23 defining an outer circumference. The cylindrical body portion 23 comprises a leading end, generally indicated at 25, and a conduit attachment end 17, disposed on either end of the cylindrical body portion 23. The leading end 25 comprises a leading chamfered surface 24 and a relief 26 disposed adjacent the leading chamfered surface 24. The leading chamfered surface 24 is used to aid the insertion of the male coupler 22 into the female housing 28, 110. The relief 26 is also perpendicular to the longitudinal axis 18 and has a defined width which extends from the outer circumference of the cylindrically body portion 23 to an inner circumference smaller than the outer circumference.

The assembly 22 is characterized by truncated surface means 29 for increasing the circumference of the cylindrical body portion 23 from the inner circumference at the relief 26 to the outer circumference by sloping upwardly at a constantly changing slope. The truncated surface means 29 slopes from the relief 26 to a point on the outer circumference further from the leading end 25 of the male coupler 22. The truncated surface means 29 is pseudo-convex in shape or, said another way, the truncated surface means 29 comprises the shape of a truncated hyperboloid. The distance between the relief 26 and the leading chamfered surface 24 is less than the defined width of the relief 26. This allows for a smaller, more compact end fitting assembly 10, 110 which reduces costs due to fewer materials used.

The male coupler 22 further comprises a beveled surface 27 which separates the leading chamfered surface 24 and the relief 26.

Returning our attention specifically to FIGS. 1 and 2, the subject invention 22 is inserted into the female housing means 28. The female housing means 28 is fixedly secured to the support structure 20 and receives the male coupler 22 therein. Located inside the female housing means 28 is the locking means, generally indicated at 30. The locking means 30 is fully enclosed by the female housing means 28 and removably secures the male coupler 22 therein. The locking means 30 includes ring means 32 and biasing means 34. The ring means 32 is a single ring 32 having a frustoconical outer surface 36. The ring 32 also includes a single flat side surface 38 and a single inner chamfered edge 40. The single flat side surface 38 and the single inner chamfered surface 40 create a single tooth 41 which extends around the inner circumference of the ring 32. The single inner chamfered surface 40 coacts with the leading chamfered surface 24 of the female coupler 22 to allow the male coupler 22 to pass therethrough. The relief 26 of the male coupler 22 abuts the single flat side surface 38 of the ring 32 whenever the male coupler 22 is positioned and not concentric with the ring 32. The male coupler 22 may be inserted into the female housing means 28 in any of a plurality of rotational orientations about the longitudinal a is 18 because both the relief 26 of the male coupler 22 and the single flat side surface 38 of the ring 32 circumscribe their respective parts.

The locking means 30 further includes biasing means 34. The biasing means 34 continuously biases the ring 32 off-axis in relation to the longitudinal axis 18. When the male coupler 22 is inserted into the female housing means 28, the biasing means 34 continously biases the ring 32 into abutting engagement with the relief 26 of the male coupler 22.

The female housing means 28 further includes lock access means 42 for receiving a tool in the female housing means 28. The tool may be any tool with a small round head at the end of the narrow neck wherein the neck is longer than the length of the lock access means 42. The lock access means 42 is placed diametrically opposite the biasing means 34 with respect to the ring 32. The tool is inserted into the lock access means 42 to apply a force to the ring 42 opposite in direction and coaxial in orientation to the force being applied to the ring 32 by the biasing means 34. Once the force supplied to the ring 32 by the tool is greater than the force being applied by the biasing means 34, the ring 32 may be moved on-axis in relation to the longitudinal axis 18. This allows the male coupler 22 to be moved from the female housing means 28. The biasing means 34 of the locking means 30 typically comprises a compressible spring.

The lock access means 42 comprises a hole 42 extending through said female housing means 28. The access of the hole 42 is coaxial with the center of the spring 34 and is perpendicular to the longitudinal axis 18.

The female housing means 28 further includes retaining clip means 44 for selectively moving into and out of a locking position for locking the ring 32 off-axis in relation to the longitudinal axis. The retaining clip means 44 is a secondary safety feature of the locking means 30. The retaining clip means 44 includes a retaining clip 44 having first 48 and second 50 arms. The first 48 and second 50 arms extend substantially in the same direction and have non-uniform space therebetween wherein the space has a small portion. The first arm 48 extends through the ring 32 when the retaining clip 44 is in the locking position. The second member 50 is received by the track means 52 of the female housing means 28. The track means 52 guides the retaining clip 44 and secures the retaining clip 44 in the locking position. The track means 52 further includes ridge means 54 which prevent the retaining clip 44 from moving out of the locking position.

The female housing means 28 further includes attachment means 62 (not shown in FIG. 2) for attaching the female housing 28 to the support structure or a helm 20. The attachment means 62 comprises two mounting holes 64, 66. The two mounting holes 64, 66 receive mounting screws, rivets or any other type of fastener known in the art. The two mounting holes 64, 66 are parallel to each other and lie in a plane that is perpendicular to the longitudinal axis.

Turning to FIG. 3, the subject male coupler 22 is shown having a bolt between the relief 26 and the truncated surface means 29. This view shows the relationship between the male coupler 22 and the removable bolt 116. The removable bolt 116 is perpendicular to and spaced apart from the longitudinal axis 18. FIGS. 4 and 5 show the male coupler 22 inserted into the second female housing means 110. The second female housing means 110 is substantially cylindrical in shape having an inner circumference greater than the outer circumference of the male coupler 22. The second female housing means 110 includes two holes (not shown) positioned on opposite sides of the second female housing means 110 which receive the removable bolt 116 therein. As maybe seen in FIGS. 3-5, once the male coupler 22 is inserted into the second female housing means 110, the removable bolt 116 may be inserted into the two holes thus preventing the male coupler 22 from being removed from the second female housing means 110. The truncated surface means 29 provides sufficient space for the removable bolt 116 to pass therethrough.

The removable bolt 116 comprises a long cylindrical body 118 having a tool engagement end 120 and a threaded end 122 disposed on either end of the long cylindrical body 118. The threaded end 122 receives a nut 124 which secures the removable bolt 116 in the locking position.

The second female housing means 110 comprises two flanges 126, 128 wherein each flange 126,128 comprises mounting means 130 for mounting the second female housing means 110 to a support structure 20. (For clarity, FIG. 5 shows neither the flanges 126,128 nor the mounting means 130). As was discussed earlier, the mounting means 130 includes two mounting holes 132,134 for receiving mounting screws or the like therein thus securing the second female housing means 110 to a support structure 20 or bulkhead.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A male coupler end fitting assembly (10) for coupling a flexible conduit (14) to a female housing (28) having a flexible core element (12) extending therethrough, said assembly (10) comprising:

a flexible conduit (14) having a longitudinal axis (18) extending between opposite ends;

a male coupler (22) fixedly attached to said flexible conduit (14) for removably securing said flexible conduit (14) to a support structure (20);

said male coupler (22) including a substantially cylindrical body portion (23) defining an outer circumference, said cylindrical body portion (23) having a leading end (25) and a conduit attachment end (17) disposed on either end of said cylindrical body portion (23);

said leading end (25) having a leading chamfered surface (24) and a relief (26) circumscribing said male coupler (22), said relief (26) disposed adjacent said leading chamfered surface (24) and perpendicular to said longitudinal axis (18), said relief (26) including a defined width extending from said outer circumference to an inner circumference smaller than said outer circumference;

truncated surface means (29) for increasing the circumference of said cylindrical body portion (23) from said inner circumference at said relief (26) to said outer circumference by sloping upwardly at a constantly changing slope, said assembly (10) characterized by;

said leading chamfered surface (24) disposed from said relief (26) a distance smaller than said defined width of said relief (26) for receiving means for coacting between a female housing, said truncated surface means and relief to retain said male coupler and flexible conduit in said female housing.

2. An assembly (10) as set forth in claim 1 further characterized by said truncated surface means (29) sloping from said relief (26) upwardly toward said conduit attachment end (17).

3. An assembly (10) as set forth in claim 2 further characterized by said truncated surface means (29) having the shape of a truncated hyperboloid.

4. An assembly (10) as set forth in claim 3 further characterized by a beveled surface (27) separating said leading chamfered surface (24) and said relief (26).

* * * * *